(12) United States Patent
Dawley

(10) Patent No.: US 9,787,086 B2
(45) Date of Patent: Oct. 10, 2017

(54) LIMITING AMPLITUDE OF ELECTRICITY DELIVERED TO AN ELECTRICAL LOAD

(71) Applicant: Electronic Systems Protection, Inc., Knightdale, NC (US)

(72) Inventor: Robert A. Dawley, Clayton, NC (US)

(73) Assignee: Electronic Systems Protection, Inc., Knightdale, NC (US)

( * ) Notice: Subject to any disclaimer, the term of this patent is extended or adjusted under 35 U.S.C. 154(b) by 338 days.

(21) Appl. No.: 14/633,735

(22) Filed: Feb. 27, 2015

(65) Prior Publication Data

US 2016/0254662 A1   Sep. 1, 2016

(51) Int. Cl.
| | |
|---|---|
| *H02H 9/04* | (2006.01) |
| *H02H 9/02* | (2006.01) |
| *H02H 3/04* | (2006.01) |
| *H02H 3/20* | (2006.01) |
| *H02H 1/00* | (2006.01) |

(52) U.S. Cl.
CPC ............... *H02H 9/02* (2013.01); *H02H 3/04* (2013.01); *H02H 3/20* (2013.01); *H02H 1/0007* (2013.01)

(58) Field of Classification Search
CPC .......... H02H 1/0007; H02H 3/04; H02H 3/20; H02H 9/02; H02H 3/22; H02H 9/04
USPC .................................................. 361/93.1, 86
See application file for complete search history.

(56) References Cited

U.S. PATENT DOCUMENTS

| 4,152,656 A | 5/1979 | Udvardi-Lakos |
| 8,873,211 B1 | 10/2014 | Butler |
| 2011/0068849 A1 | 3/2011 | Grover |

FOREIGN PATENT DOCUMENTS

CN        104134997 A  *  11/2014

OTHER PUBLICATIONS

Machine translation of Tian et al. Chinese Patent Document CN 104134997 A, Nov. 5, 2014.*
European Search Report issued in corresponding European Patent Application No. 16157578, mailed on Jun. 28, 2016.

* cited by examiner

*Primary Examiner* — Thienvu Tran
*Assistant Examiner* — Kevin J Comber
(74) *Attorney, Agent, or Firm* — Edell, Shapiro & Finnan LLC

(57) ABSTRACT

To protect an electrical load connected to an output port from anomalous electricity in an apparatus that provides output electricity at the output port from input electricity accepted through an input port thereof, an input sensing unit is electrically connected to the input port and configured to indicate an overvoltage event. A power control unit generates, responsive to the overvoltage event, a modulation signal that defines at least one amplitude notch of variable temporal width. A switching mechanism electrically interposed between the input port and the output port transitions into conducting and non-conducting states in accordance with the modulation signal to superimpose the amplitude notch on electricity conveyed to the output port through the switching mechanism.

17 Claims, 13 Drawing Sheets

LIMITING AMPLITUDE OF ELECTRICITY DELIVERED TO AN ELECTRICAL LOAD

TECHNICAL FIELD

The present disclosure relates to limiting voltage delivered by power conditioning and control systems.

BACKGROUND

Electrical load protection devices are electrically interposed between electrical load equipment and electrical source equipment and are designed to protect the load equipment from exceptionable characteristics of electricity received from the source equipment. One type of electrical load protection device is the surge suppressor, which is used to prevent voltage surges from reaching the load equipment. As used herein, a power or voltage surge, or simply "surge," is a transient overvoltage condition of short duration, e.g., 20-50 µs. Traditional surge suppression techniques include shunting mode suppression, by which surge energy is shunted to a neutral or ground conductor. Examples of such shunting techniques are disclosed in U.S. Pat. No. 5,136,455 dated Aug. 4, 1992 and entitled, "Electromagnetic Interference Suppression Device," and U.S. Reissue Pat. RE39,446 dated Dec. 26, 2006 and entitled, "Power Filter Circuit Responsive to Supply System Fault Conditions." Another surge suppression technique is series mode suppression, by which surge energy is series limited and canceled, and may be further ameliorated by shunt absorption. Examples of series mode suppression techniques are disclosed in U.S. Pat. No. 6,728,089 dated Apr. 27, 2007 and entitled, "Surge Suppressor for Wide Range of Input Voltages," U.S. Pat. No. 6,744,613 dated Jun. 1, 2004 and entitled, "System and Method for Filtering Multiple Adverse Characteristics from a Power Supply Source," U.S. Pat. No. 7,184,252 dated Feb. 27, 2007 and entitled, "Surge Protector with Input Transformer," and U.S. Pat. No. 7,511,934 dated Mar. 31, 2009 and entitled, "System and Method for Conditioning a Power Supply Transmission for Supply to a Load Circuit."

Shunt mode suppression typically carries the lowest cost and is the smallest size option, but it allows exposure of connected load equipment to fairly high amplitude residual voltages. The cost of implementing series mode suppression is typically higher than that of shunt mode suppressors and they are usually larger in size. However, series mode suppressors are capable of limiting exposure to surge voltages at the load to much lower levels, e.g., to within ±10% of the nominal AC line voltage envelope. One drawback common to both of these technologies is that neither provides adequate mitigation of persistent AC overvoltage, referred to herein as a "voltage swell.".

Voltage swells are characterized by their RMS magnitude and duration. For example, the Institute of Electrical and Electronics Engineers (IEEE) 1159 defines a voltage swell as an increase in the root-mean squared (RMS) voltage level to 110%-180% of nominal at the power frequency for durations of ½ cycle to one (1) minute. It is classified as a short duration voltage variation phenomena, although typically much longer than a voltage surge. Voltage swell is basically the opposite of a voltage sag or dip and although the effects of a voltage sag are more noticeable, the effects of a voltage swell are often more destructive. Voltage swells may cause breakdown of components through gradual, cumulative effects, and can cause control problems and hardware failure in the equipment due to overheating that could eventually result in shutdown. Thus, efforts to develop and/or improve mitigation techniques for both voltage surges and voltage swells, among other undesirable power conditions, are ongoing.

SUMMARY

To protect an electrical load connected to an output port from anomalous electricity in an apparatus that provides output electricity at the output port from input electricity accepted through an input port thereof, an input sensing unit is electrically connected to the input port and configured to indicate an overvoltage event. A power control unit generates, responsive to the overvoltage event, a modulation signal that defines at least one amplitude notch of variable temporal width. A switching mechanism electrically interposed between the input port and the output port transitions into conducting and non-conducting states in accordance with the modulation signal to superimpose the amplitude notch on electricity conveyed to the output port through the switching mechanism.

DESCRIPTION OF EXAMPLE EMBODIMENTS

Figure 1A:
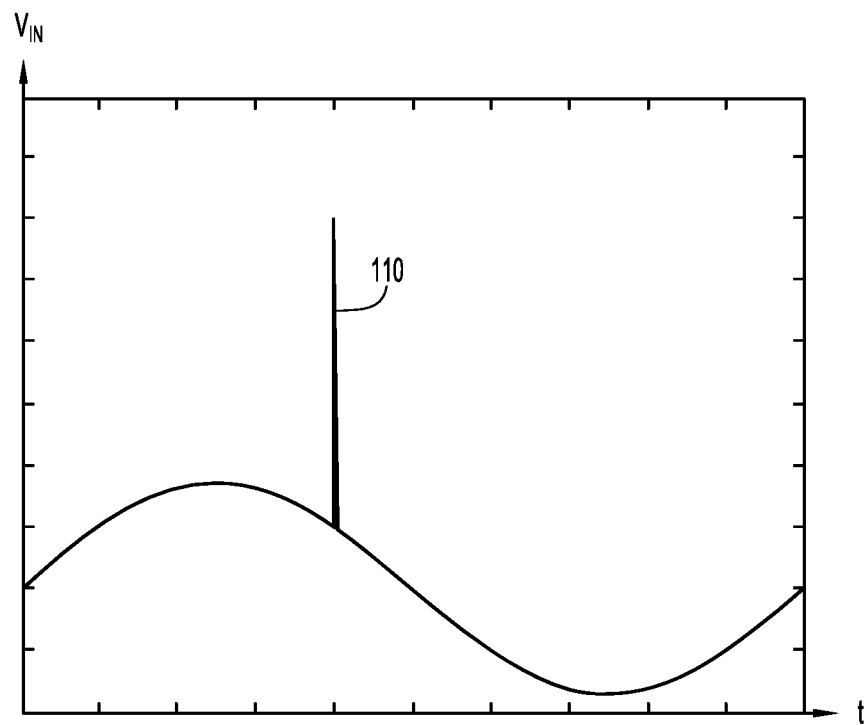
FIGS. 1A-1C are diagrams of voltage waveforms illustrating anomalous electricity mitigation by embodiments of the present general inventive concept.
Figure 1A:
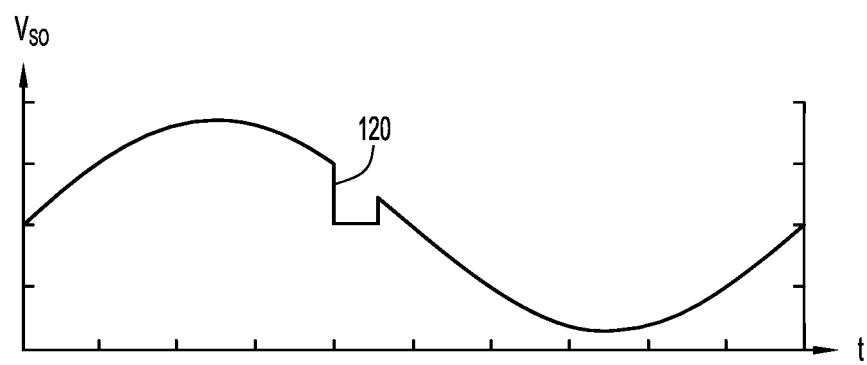

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The figures described herein include schematic block diagrams illustrating various functional modules for purposes of description and explanation. Such diagrams are not intended to serve as electrical schematics and interconnections illustrated are merely to depict various interoperations between functional components and/or processes and are not necessarily direct electrical connections between such components. Moreover, the functionality illustrated and described via separate components need not be distributed as shown, and the discrete blocks in the diagrams are not intended to depict discrete electrical components.

Figure 1B:
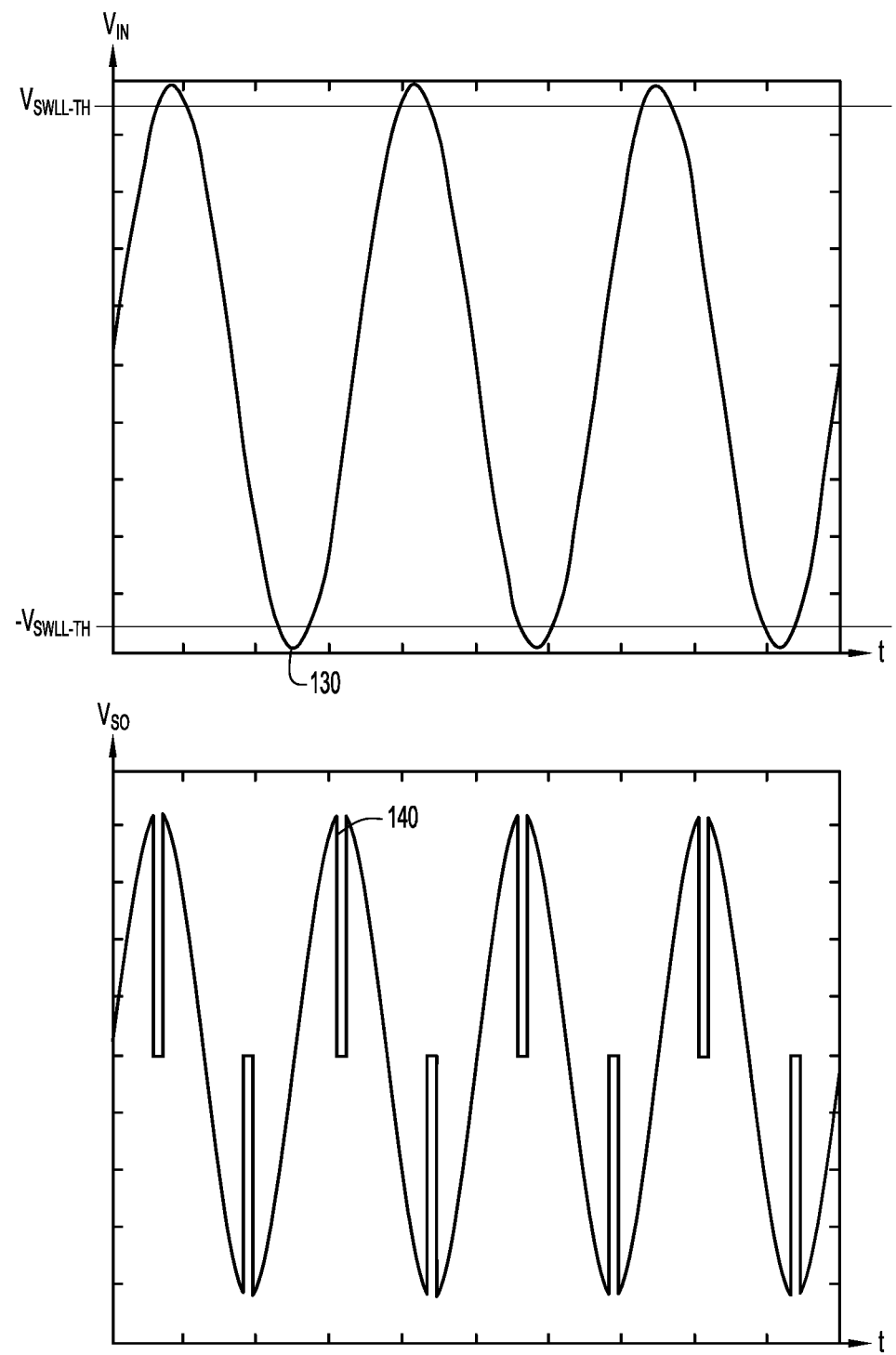

The present invention may be embodied to mitigate both transient surge overvoltage conditions and persistent swell overvoltage conditions. To that end, embodiments may include switching circuitry capable of changing state very rapidly, e.g., on the order of 1 μs, and associated control methods to "notch" transient voltages from the delivered electricity. FIG. 1A illustrates a voltage surge 110 superimposed onto input voltage $V_{IN}$. Through an embodiment of the present invention, a corresponding voltage notch 120 is established in switch output voltage $V_{SO}$ at the location in the waveform at which surge 110 was located on $V_{IN}$. Similar mitigation of voltage swells, in which peaks 130 of $V_{IN}$ exceed a predetermined threshold $V_{SWLL-TH}$, is illustrated in FIG. 1B. Through an embodiment of the present invention, voltage notches, representatively illustrated by voltage notch 140, are established in $V_{SO}$ at each offending peak location.

Figure 1C:
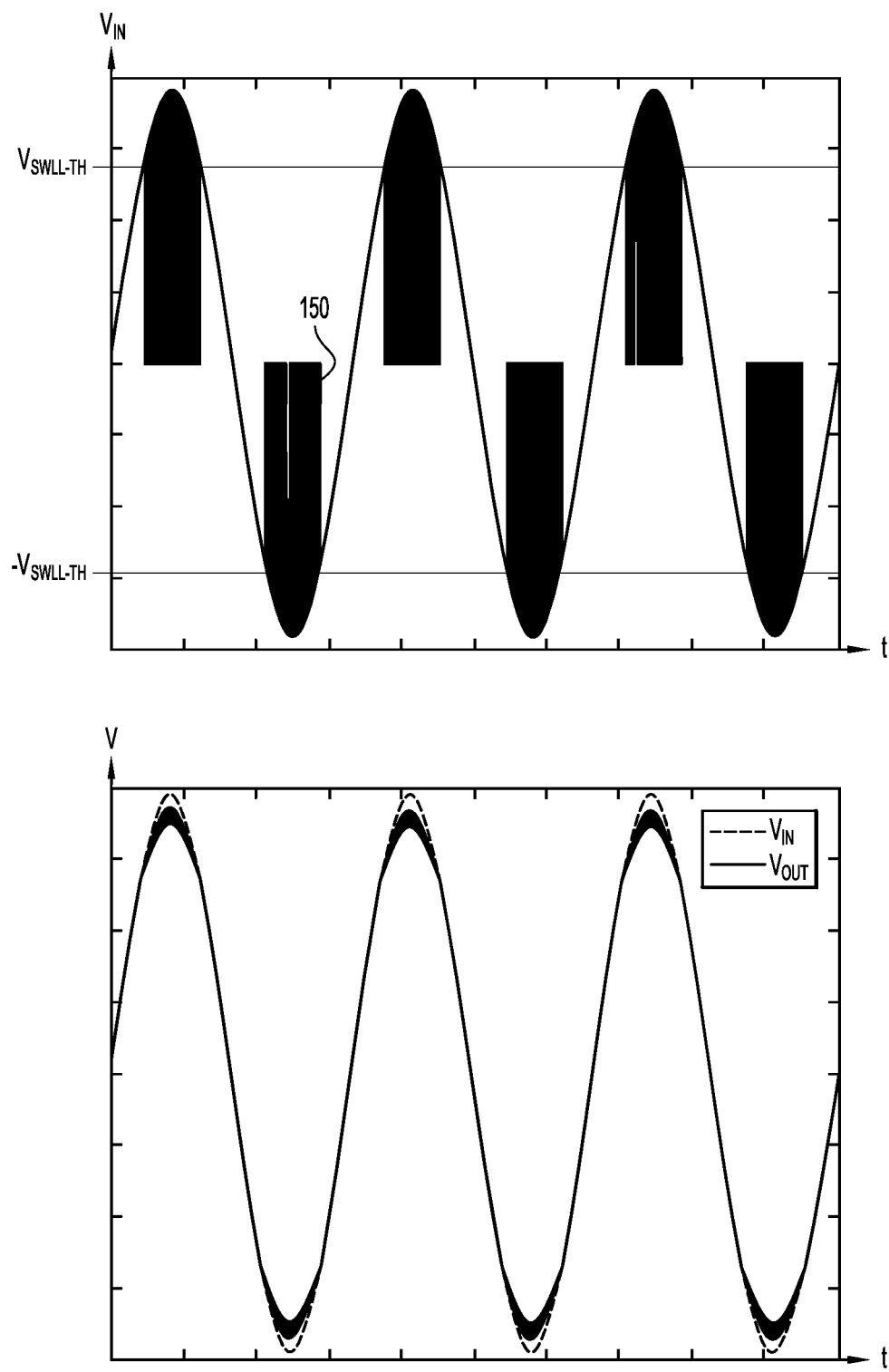

Another technique by which embodiments of the present invention can mitigate voltage swells is illustrated in FIG. 1C. For each peak location at which $V_{IN}$ exceeds $|V_{SWLL-TH}|$, multiple voltage notches 150 may be established in accordance with a pulse width modulation (PWM) scheme. The resulting waveform may be subjected to low pass filtering or other smoothing techniques to produce output voltage $V_{OUT}$, which, as illustrated in FIG. 1C, follows well with the $V_{IN}$ waveform with the exception that $V_{OUT}$ remains bounded within acceptability criteria, e.g., within a predetermined range of a possibly load-dependent nominal voltage.

Figure 2:
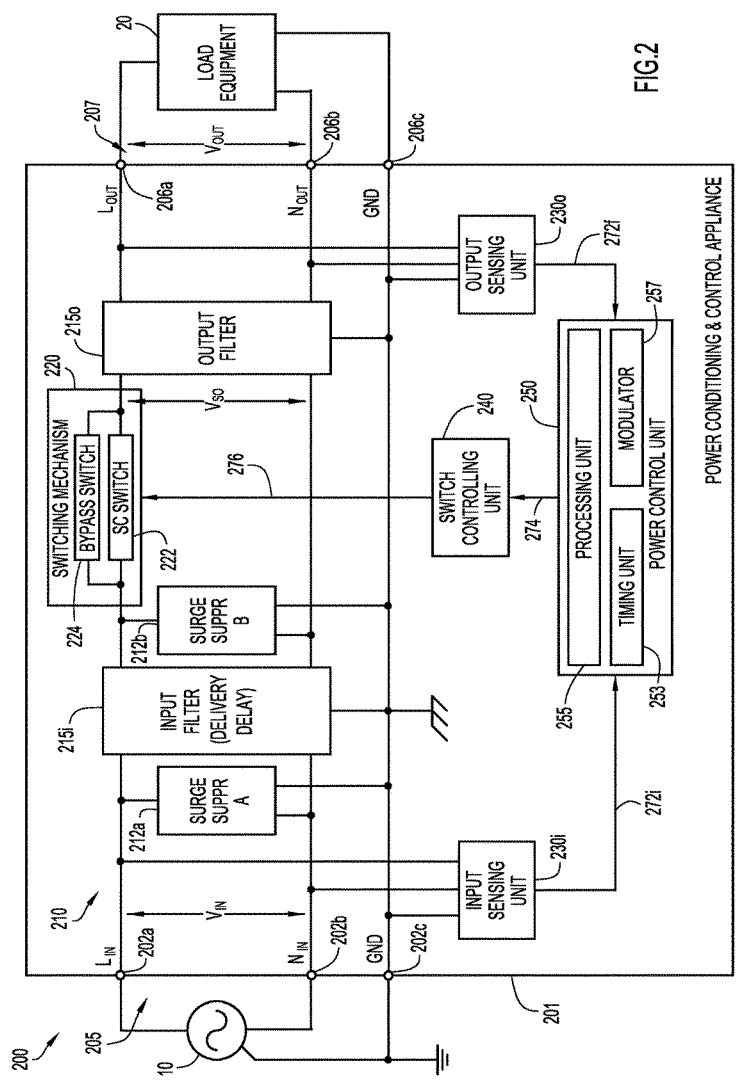
FIG. 2 is a schematic block diagram of a power conditioning and control appliance by which the present general inventive concept can be embodied.

FIG. 2 is a schematic block diagram of an exemplary power conditioning and control appliance (PCCA) 200 by which the present invention can be embodied. Exemplary PCCA 200 is an electrical circuit that can, when electrically interposed between an electrical source 10 and electrical load equipment 20, improve electrical power quality and protect load equipment 20 against various exceptionable electrical conditions.

It is to be understood that the functional blocks of which exemplary PCCA 200 is comprised are conceptual and are not intended to represent specific, individual components or hard functional boundaries. That is, separation of power conditioning and control functionality into the blocks illustrated in FIG. 2 and elsewhere in this disclosure is intended solely to facilitate efficient description of exemplary embodiments of the present invention. Indeed, the functionality of the separate modules illustrated in FIG. 2 may be combined, divided, and otherwise repartitioned into other modules, essentially without limitation. Additionally, components other than and/or in addition to those illustrated in and described herein may be incorporated into PCCA 200 or other embodiments of the present invention. Upon review of this disclosure, those having skill in the power conditioning and control arts will recognize numerous configurations in which PCCA 200 may be realized without departing from the spirit and intended scope of the present invention.

Exemplary PCCA 200 comprises an AC conditioned power delivery unit 210, or simply "power delivery unit 210," a switching mechanism 220, an input sensing unit 230i, an output sensing unit 230o, a switch controlling unit 240 and a power control unit 250. In certain embodiments, power delivery unit 210, switching mechanism 220, input sensing unit 230i, output sensing unit 230o, switch controlling unit 240 and power control unit 250 are disposed on a chassis or contained within a housing, generally referred to herein as housing 201. One or more input ports 205 comprising input terminals 202a-202c may be disposed on housing 201 through which input electrical power is accepted from an electrical power source, such as AC power source 10. Additionally, one or more output ports 207 comprising output terminals 206a-206c may be disposed on housing 201 through which output electrical power is provided to electrical load equipment 20. It is to be understood that while PCCA 200 is described herein as being intended for use with AC electrical systems, the inventive concepts described herein could also be applied to DC electrical systems. Additionally, for purposes of explanation, it is to be assumed that PCCA 200 is constructed or otherwise configured to mitigate both transient surge overvoltage conditions and persistent swell overvoltage conditions by way of the notching techniques exemplified herein.

Power delivery unit 210 of PCCA 200 may include surge suppression circuitry, illustrated in FIG. 2 as surge suppression stages 212a and 212b, collectively referred to herein as surge suppressor 212. Surge suppression stage 212a provides initial surge suppression and may be constructed from metal oxide varistors (MOVs), or MOVs combined with gas discharge tubes, or series mode technologies. Surge suppression stage 212b may provide secondary/supplementary surge suppression and, in addition to the aforementioned surge suppression components, may include transient voltage suppressor (TVS) diodes and/or bridge rectifier and silicon-controlled rectifier (SCR) clamp/crowbar combinations. It is to be understood that the present invention can be embodied without surge suppressor 212.

Power delivery unit 210 may include an electrical filter 215 comprising an input filter 215i and an output filter 215o. Input filter 215i may be a standard electromagnetic interference/radio-frequency interference (EMI/RFI) AC power line filter including inductors, chokes, capacitors, and resistors. Input filter 215i may, by virtue of its construction, introduce a time delay in delivery of AC power to switching mechanism 220. Such a delay allows switching mechanism 220 to be operated into an appropriate state prior to the overvoltage electrical waveform arriving thereat.

Output filter 215o may also include inductors, capacitors, and resistors interconnected to perform smoothing of output waveforms. In certain embodiments, output filter 215o may be a low-pass filter configured for smoothing notched waveforms including PWM. Output filter 215o may also provide, among other things, snubber functionality by which the impact of inductive loads subjected to rapid switching conditions is ameliorated.

Switching mechanism 220 may comprise circuitry capable of rapid state transitions, e.g., on the order of 1 μs, and that cooperates with various support circuits and control methods described below to form notches in electrical waveforms. It is to be understood that while switch circuit 220 is illustrated in FIG. 2 as being installed in the line conductor, alternative or additional circuitry can be installed in the neutral conductor and/or in other line conductors, e.g. in multiple phase AC implementations.

Switching mechanism 220 may comprise one or more power metal-oxide-semiconductor field-effect transistors (MOSFETs) in a semiconductor switch component 222, preferred for their inherent body diode, switching speed, and ease of use. Other power semiconductor devices may be utilized to perform equivalent functions, including insulated-gate bipolar transistors (IGBTs) and gate turn-off (GTO) thyristors. Switching mechanism 220 may be a hybrid switch circuit that includes a bypass switch component 224, such as an electromagnetic relay, electrically connected in parallel with semiconductor switch component 222. When so embodied, bypass switch component 224 may be operated into a closed state, thus bypassing semiconductor switch component 222, when PCCA 200 is operating under nominal operating conditions, i.e., where the input electricity is free of surges and swells. In this nominal configuration, semiconductor switch component 222 may be in its non-conducting state, whereby electrical power is provided to load equipment 20 entirely through bypass switch component 224. When an anomaly is sensed between input terminals 202a, 202b and/or 202c, semiconductor switch component 222 may be compelled into its conducting state and, shortly thereafter, bypass switch component 224 may be compelled into its open state. These actions place switching mechanism 220 in a notching mode or configuration, i.e., electrical power through switching mechanism 220 is controlled solely by the semiconductor circuitry, which can be operated at higher rates than the bypass circuitry, e.g., an electromagnetic relay. It is to be understood that bypass switch component 224 need not be implemented in order to achieve the benefits of the present invention.

Input sensing unit 230i and output sensing unit 230o, collectively referred to as condition sensing unit 230, may be constructed or otherwise configured to monitor input electricity accepted through input port 205 and output electricity provided through output port 207. Input sensing unit 230i may generate a condition-indicating signal 272i in response to various anomalies and/or exceptionable characteristics being present on the input electricity. The condition-indicating signal 272i may be provided to power control unit (PCU) 250 to prepare and operate switching mechanism 220 based on the condition indicated by condition-indicating signal 272i. PCU 250 may generate modulation signal 274 on which a modulation waveform (one or more amplitude notches) is conveyed. Modulation signal 274 may be provided to a switch controlling unit 240 that produces a switch driver signal 276 by which switching mechanism 220 is operated in accordance with modulation signal 274.

Output sensing unit 230o may be configured to monitor output electricity at output port 207. Output sensing unit 230o may generate a feedback signal 272f indicative of one or more characteristics of the output electricity, e.g., an indication of the output voltage $V_{OUT}$. Feedback signal 272f may be provided to PCU 250 to control the modulation that produces the output electricity from the input electricity. Feedback and its use in embodiments of the invention are discussed in more detail below.

Switch controlling unit 240 may be constructed or otherwise configured to drive switching mechanism 220 through rapid state transitions, e.g., on the order of 1 µs. Switch controlling unit 240 may be implemented as a fixed electrical circuit and/or as programmed processor instructions executed by a microprocessor/microcontroller. In one embodiment, switch controlling unit 240 includes a high-speed optically-isolated MOSFET/IGBT driver and associated support circuitry capable of responding to a control signal at the aforementioned 1 µs switching rate. In one alternative, switch controlling unit 240 is implemented by an optically-isolated relay, such as in systems for which the 1 µs switching rate is not essential. It is to be understood that the present invention is not limited to a particular switching rate.

Exemplary PCU 250 includes, among other possible components, a timing unit 253 by which modulation timing is realized, a processing unit 255 to, for example, track various power events and switch states and assert a modulation scheme accordingly, and a modulator 257 to generate modulation signal 274 in accordance with timing information provided by timing unit 253 and modulation scheme information provided by processing unit 255.

Timing unit 253 of exemplary PCU 250 may be constructed or otherwise configured to establish the temporal characteristics of the modulation scheme on modulation signal 274 such that, for surge mitigation, the resulting amplitude notch is as temporally narrow as possible, i.e., long enough to encompass the temporal width of the surge and the delay time through input filter 215i. Processing unit 255 may be constructed or otherwise configured to maintain operational states of power control unit 250 and to transition between such states in accordance with occurrences of power events that include surge and swell overvoltage events. Operation of an exemplary state machine as well as that of an exemplary timing unit is described in further detail below.

As will be recognized by those familiar with power control, power control unit 250 may be realized through a wide variety of processing and interface circuitry including, but not limited to fixed analog and digital logic circuits, analog-to-digital converter circuits, digital-to-analog converter circuits, programmable digital logic circuits, application specific circuits, etc., to implement, among other components, general data processors, data-specific processors, signal converters and conditioners, analog and digital signal processors, and so on.

Operation of PCCA 200 will now be described with additional reference to FIGS. 3A-3D, collectively referred to herein as FIG. 3, in which different modulation schemes are depicted. FIG. 3 diagrammatically depicts several waveforms representing those provided to and generated by circuitry in PCCA 200. It is to be understood that the waveforms of FIG. 3 are not drawn to scale and that relative size between various waveform features has been distorted for purposes of description.

Figure 3A:
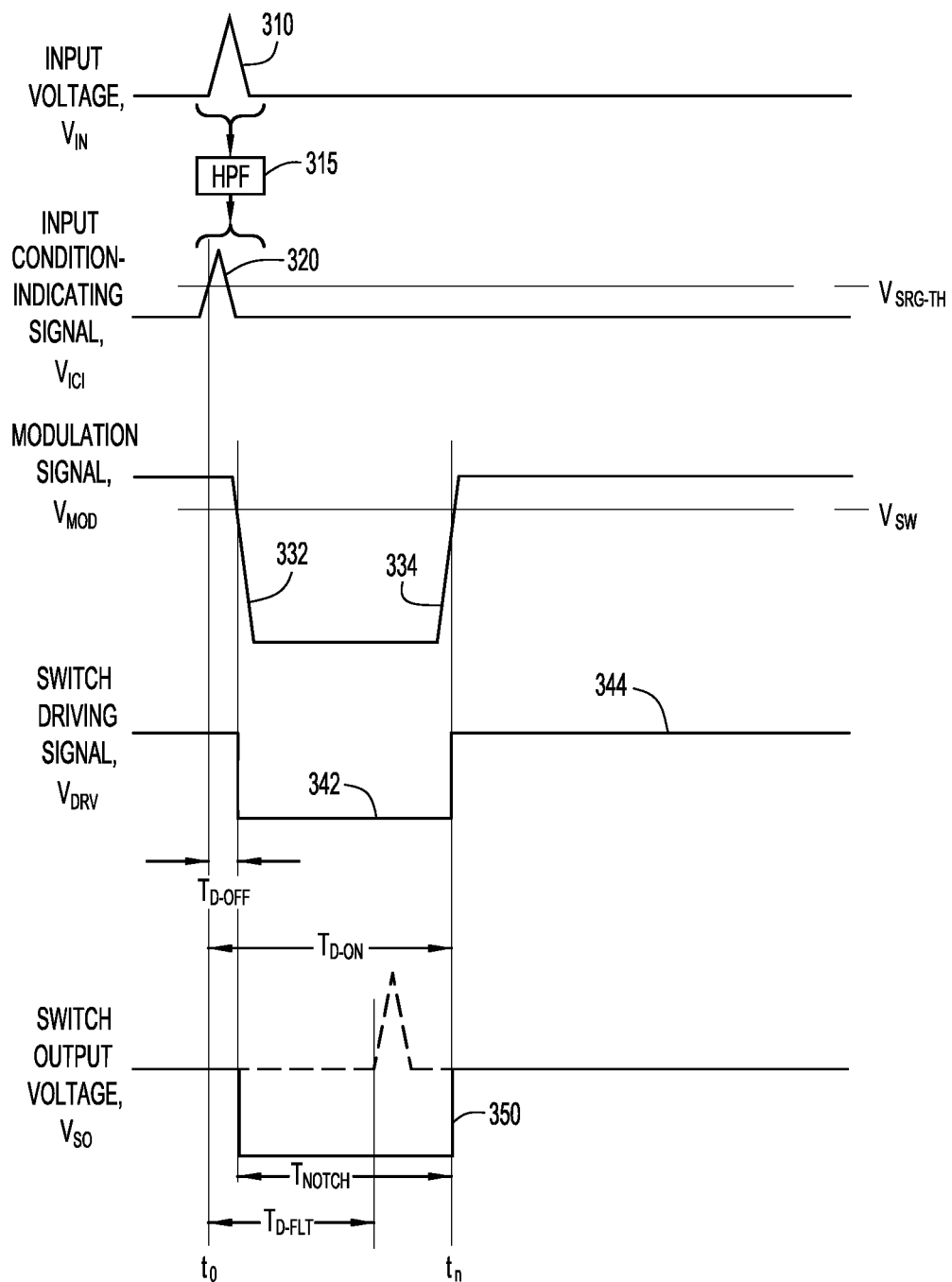
FIGS. 3A-3D are diagrams illustrating modulation schemes achieved by embodiments of the present general inventive concept.

As illustrated in FIG. 3A, an overvoltage 310 arrives at PCCA 200 on input voltage $V_{IN}$ at some instant in time $t_0$. Amplitude and spectral characteristics of $V_{IN}$ may be evaluated by, for example a high pass filtering operation 315 and an amplitude threshold operation against $V_{SRG-TH}$. If the amplitude and spectral characteristics of $V_{IN}$ indicate that overvoltage 310 is indeed a voltage surge warranting intervention, such may be indicated on input condition-indicating signal $V_{ICI}$, e.g., by way of a voltage trigger 320. Voltage trigger 320 may activate timing unit 253 of PCU 270, which may be configured with notch timing parameters in accordance with which modulation signal $V_{MOD}$ is generated. As illustrated in FIG. 3A, for example, modulation signal $V_{MOD}$ may rapidly drop, represented by voltage drop 332, in response to voltage trigger 310. Meanwhile, switch controlling unit 240 may be pre-configured with a switching threshold $V_{SW}$ so that at the rate of voltage drop 332, modulation signal $V_{MOD}$ crosses switching threshold $V_{SW}$ in an interval $T_{D\text{-}OFF}$, at which time switch controlling unit 240 generates switch driving signal $V_{DRV}$ in an OFF state 342 thereby removing output voltage $V_{OUT}$ from load equipment 20. Shortly thereafter, as established by, for example, the aforementioned notch timing parameters, modulation signal $V_{MOD}$ may rise at a predetermined rate, illustrated by voltage rise 334 in FIG. 3A. The rate of voltage rise 334 may be established by, for example, a resistor-capacitor time constant or by a timer implemented by timing unit 253. When modulation signal $V_{MOD}$ meets switching threshold $V_{SW}$ after a predetermined interval $T_{D\text{-}ON}$, switch controlling unit 240 may generate switch driving signal $V_{DRV}$ in an ON state 344 thereby compelling switching mechanism 220 into its conducting state to provide output voltage $V_{OUT}$ to load equipment 20. By prudent selection of notch timing parameters, a notch 350 of temporal width $T_{NOTCH}$ is superimposed on output voltage $V_{OUT}$ by timed action of switch mechanism 220 and, in so doing, voltage surge 310 is prevented from reaching load equipment 20.

The time delay introduced into the surge current by input filter 215$i$ is indicated herein as $T_{D\text{-}FLT}$. In exemplary PCCA 200, delay $T_{D\text{-}FLT}$ is fixed by the reactance of input filter 215$i$. However, in certain embodiments, the delay $T_{D\text{-}FLT}$ can be made a system variable through the use of, for example, electrical delay components and/or through programmed instructions in a digital implementation of PCCA 200. The time delays $T_{D\text{-}OFF}$ and $T_{D\text{-}ON}$ can be user-selected or configurable timing parameters so that voltage surge 310 is encompassed by a minimally-narrow notch 350 having a notch onset time $T_{D\text{-}OFF}$ and a notch completion time $T_{D\text{-}ON}$.

Figure 3B:
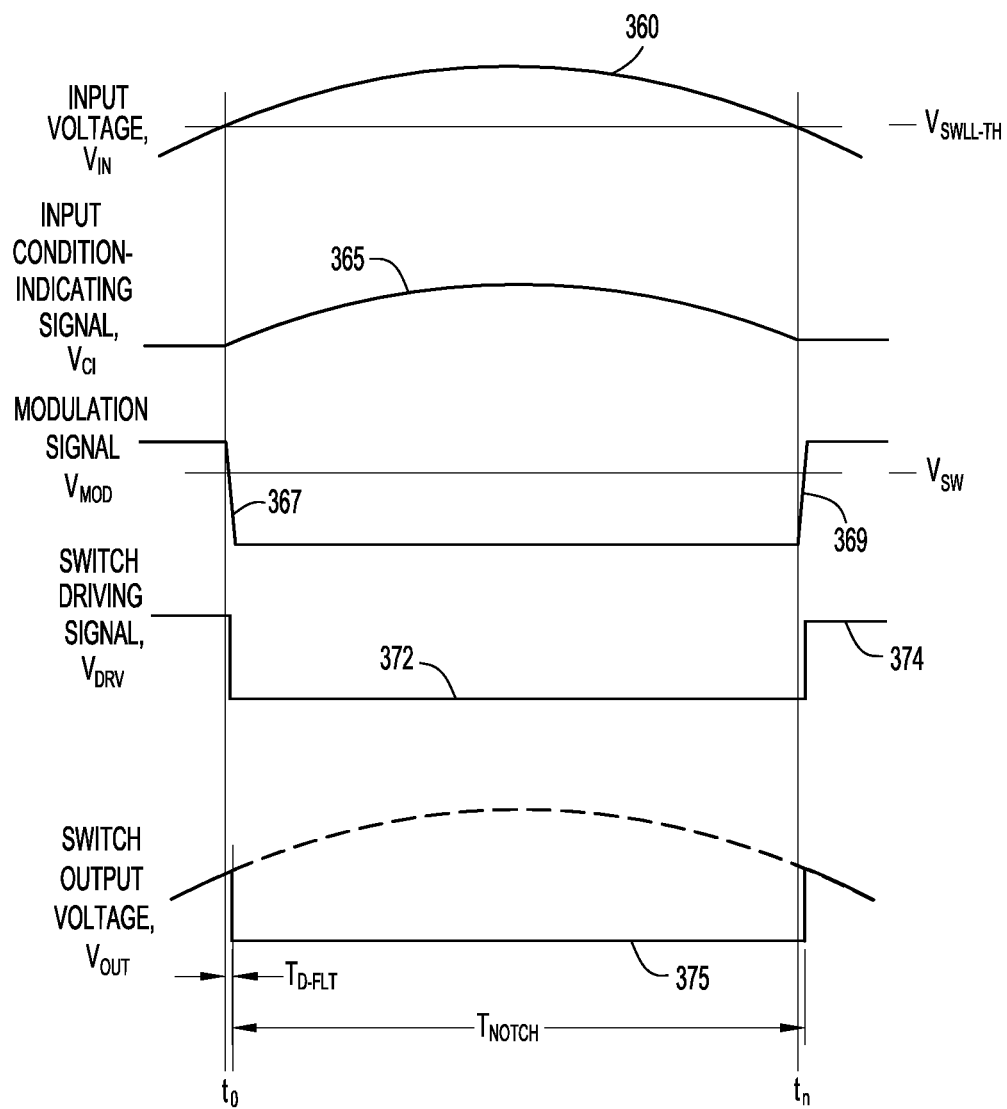

FIG. 3B is a diagram of several exemplary waveforms by which amelioration of voltage swells is explained. At time $t_0$, an overvoltage, illustrated by way of voltage peak 360, may arrive on the input voltage waveform $V_{IN}$. The overvoltage peak 365, i.e., the portion of $V_{IN}$ that is over threshold $V_{SWLL\text{-}TH}$, may be established in input condition-indicating signal $V_{ICI}$ by input sensing unit 230$i$.

As illustrated in FIG. 3B, modulation signal $V_{MOD}$ may fall in response to the presence of peak 365 on condition-indicating signal $V_{ICI}$ and may rise in response to the absence of peak 365 on condition-indication signal $V_{ICI}$. In a manner similar to that explained for surge events, the voltage drop 367 of modulation signal $V_{MOD}$ to cross switching threshold $V_{SW}$ may compel switch controlling unit 240 to generate switch driving signal $V_{DRV}$ into an OFF state 372 thereby removing output voltage $V_{OUT}$ from load equipment 20. A subsequent voltage rise 369 of modulation signal $V_{MOD}$ may cross switching threshold $V_{SW}$ to compel switch controlling unit 240 to generate switch driving signal $V_{DRV}$ in an ON state 374 thereby compelling switching mechanism 220 into its conducting state to provide output voltage $V_{OUT}$ to load equipment 20. Thus, notch 375 of temporal duration $T_{NOTCH}$ is superimposed on output voltage $V_{OUT}$ by timed action of switch mechanism 220 and, in so doing, overvoltage peaks 360 of the voltage swell are prevented from reaching load equipment 20.

Figure 3C:
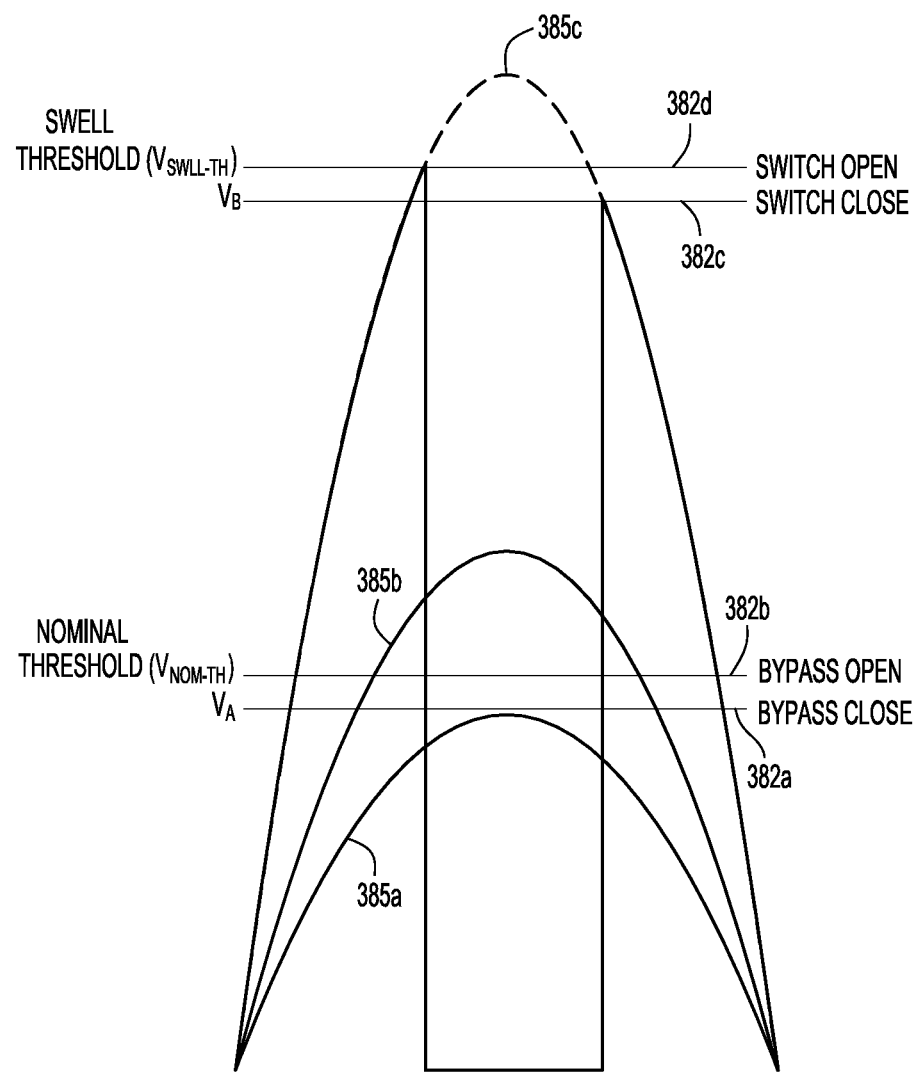

FIG. 3C is a diagram of several exemplary waveforms by which amelioration of voltage swells can be further explained. As indicated above, certain embodiments of the present invention implement a bypass switch component 224 in switching mechanism 220. Typically, the load current conductive path through bypass switch component 224 is of lower resistance than that of the path through semiconductor switch component 222, but transitioning between conducting and non-conducting states can be achieved at much faster rates in semiconductor switch component 222 than in bypass switch circuit 224. Accordingly, switching mechanism 220 may be "preconditioned" for modulation, such as by opening bypass switch component 224 in anticipation of rapid switch transitions by semiconductor switch component 222 to form the voltage notches.

In one embodiment, a plurality of switch transition boundaries 382$a$-382$d$ may be established by, for example, immutable system parameters or by user-alterable variables. As illustrated in FIG. 3C, switch transition boundaries 382$a$-382$d$, representatively referred to herein as switch transition boundary or boundaries 382, define criteria on $V_{IN}$. Voltage waveforms 385$a$-385$c$ represent measurements of $V_{IN}$, referred to herein as $V_{SENSE}$, at different times in accordance with which bypass switch component 224 and semiconductor switch component 222 are independently operated. In the illustrated example, input voltage $V_{IN}$ is considered within nominal range when $V_{SENSE}$ is no greater than nominal threshold voltage $V_{NOM\text{-}TH}$, which corresponds with switch transition boundary 382$b$. Waveform 385$a$ represents $V_{SENSE}$ that is in nominal range. While an overvoltage condition exists when $V_{SENSE}$ exceeds nominal voltage threshold $V_{NOM\text{-}TH}$, such as represented by waveform 385$b$, not all overvoltage events require removal of power from load equipment by switching component 220. In certain embodiments, $V_{IN}$ is measured prior to being filtered and surge-suppressed and, as such, some overvoltage events that meet the criterion $V_{SENSE} > V_{NOM\text{-}TH}$ may be handled by other processes, such as the aforementioned filtering by input filter 215$i$, output filter 215$o$, and surge-suppressed by surge suppressor 212. An overvoltage that requires intervention by modulation techniques described herein is referred to as meeting an "overvoltage condition," which occurs in the illustrated example when $V_{SENSE} \geq V_{SWLL\text{-}TH}$. Waveform 385$c$ demonstrates such an overvoltage condition.

As illustrated in FIG. 3C, semiconductor switch component 222 may transition from conducting to non-conducting state (switch open) in response to rising $V_{SENSE}$ meeting $V_{SENSE} \geq V_{SWLL\text{-}TH}$ and may transition from non-conducting to conducting state (switch close) in response to falling $V_{SENSE}$ meeting or falling below switch transition boundary $V_B$, which corresponds to transition boundary 382$c$. The dual criteria realizes hysteresis in the operation of switch component 222; hysteresis may be similarly realized in bypass switch component 224 through nominal threshold voltage $V_{NOM\text{-}TH}$ and switch transition boundary $V_A$, which corresponds to transition boundary 382$a$. However, other criteria may be placed on the state transitions of bypass switch component 224; certain implementations may require bypass switch component 224 to remain open over multiple AC cycles, such as over the duration of a voltage swell.

Figure 3D:
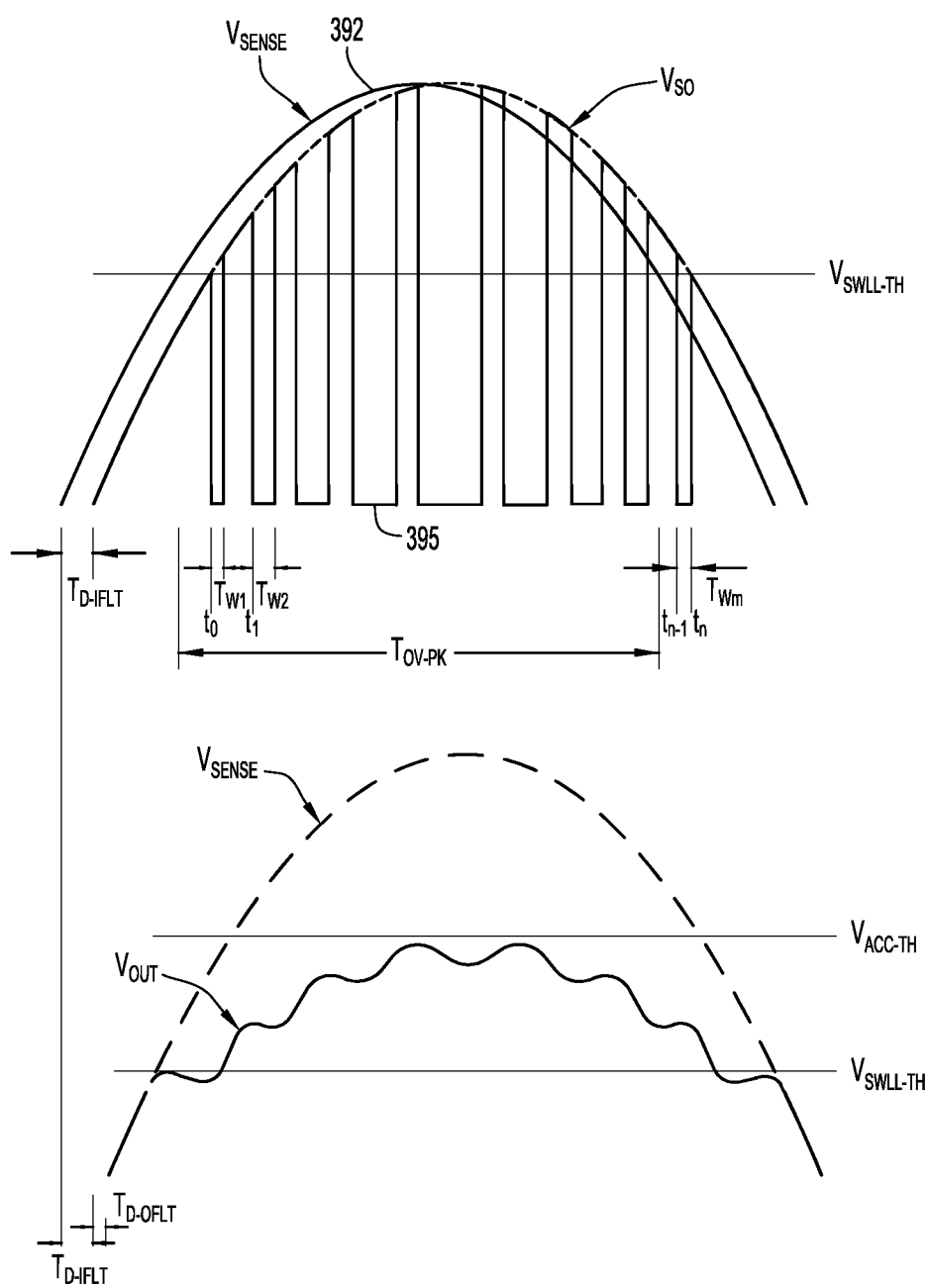

FIG. 3D is a diagram of several exemplary waveforms demonstrating another technique by which embodiments of the present invention ameliorate voltage swells. Swell overvoltage peak 392 is defined by a crossing of threshold $V_{SWLL\text{-}TH}$ by $V_{SENSE}$, the temporal span of which is denoted herein as $T_{OV\text{-}PK} = (t_n - t_0)$. It is to be understood, however, that $V_{SWLL\text{-}TH}$ may be established in conjunction with an acceptability criterion on $V_{OUT}$, such as an acceptability threshold $V_{ACC\text{-}TH}$. For example, $V_{IN}$ crossing $V_{SWLL\text{-}TH}$ may assert the onset of modulation, as described above, but the modulation itself may be controlled by the relationship between $V_{OUT}$ and $V_{ACC\text{-}TH}$.

During the interval $T_{OV\text{-}PK}$, power control unit 250 may modulate $V_{IN}$ with a plurality of notches, representatively illustrated at notch 395, of varying width $T_{W_i} = 1, 2, \ldots, m$. The number and temporal widths of notches 395 may be established in accordance with a PWM process implemented by, for example, modulator 257, based on the voltage level of $V_{OUT}$ provided thereto by output sensing unit 230$o$. $V_{OUT}$ is derived from $V_{SO}$, the modulated input waveform, through filtering by output filter 215$o$, which may introduce a temporal delay $T_{D\text{-}OFLT}$ between $V_{SO}$ and $V_{OUT}$. $V_{OUT}$ may be monitored by output sensing unit 230o, which in turn provides a feedback signal 272f to power control unit 250. Power control unit 250 may compel switching mechanism 220 into the appropriate conducting or non-conducting state so that $V_{OUT}$ meets an acceptability criterion, e.g., $V_{OUT} \leq V_{ACC-TH}$.

Figure 4:
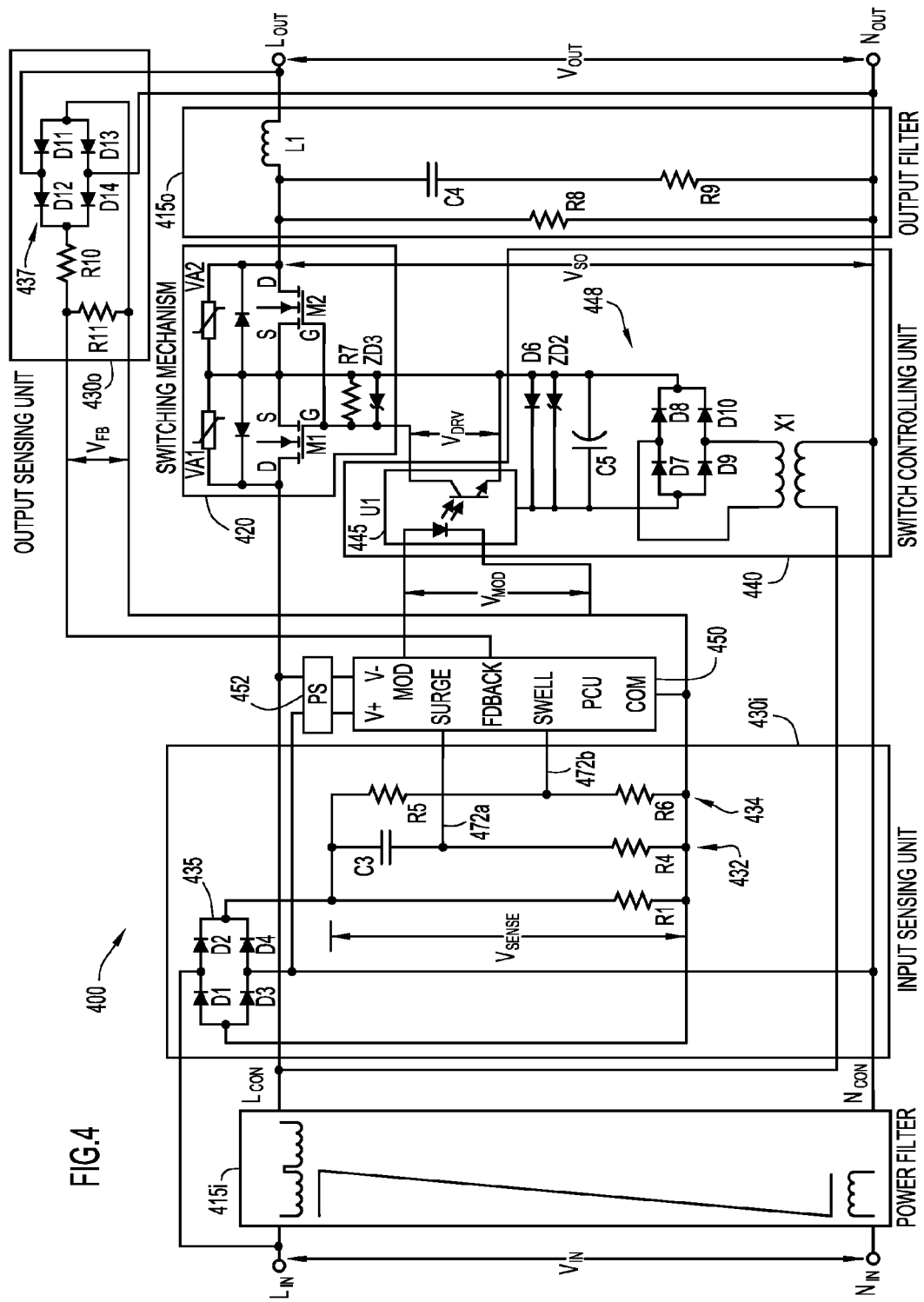
FIG. 4 is a schematic diagram of a power conditioning and control circuit by which the present general inventive concept can be embodied.

FIG. 4 is an electrical schematic diagram of an exemplary circuit 400 embodiment of the present invention. PCCA 400 embodies the present invention in a functionally similar manner as that of PCCA 200. Accordingly, PCCA 400 may be viewed as comprising an input sensing unit 430i, by which input electricity is monitored for anomalies, an output sensing unit 430o, by which output electricity is monitored against acceptability criteria, a switching mechanism 420, by which provision of output power to load equipment (not illustrated) is selectively established based on the state of the monitored input and output electricity, a switch controlling unit 440, by which switching mechanism 420 is operated in accordance with a modulation signal and a power control unit (PCU) 450, by which modulation signal $V_{MOD}$ is generated responsive to a power event indicated by input condition-indicating signal 472. Input condition-indicating signal 472 is illustrated in FIG. 4 as being provided to PCU 450 in separate signal components: a signal component 472a providing the indication of surge overvoltage events and a signal component 472b providing the indications of swell overvoltage events. It is to be understood that the present invention is not limited to particular physical and logical formats in which input condition-indicating signal 472 is generated.

In certain embodiments, PCCA 400 includes a power filter 415i and an output filter 415o. Power filter 415i may be electrically interposed between line and neutral conductors $L_{IN}$ and $N_{IN}$, to which an electrical power source may be connected, and line and neutral conductors $L_{CON}$ and $N_{CON}$, respectively, on which conditioned electrical power may be provided. Power filter 415 may include filtering components, such as described above with reference to input filter 215i, and surge suppression components, such as described above with reference to surge suppression circuits 212a-212b. Consequently, power filter 415i may impart a known delay in delivery of electrical current.

Output filter 415o may include a lowpass filter comprising shunt components, e.g., resistor R8 and resistor/capacitor R9/C4 and series components, e.g., inductor L1. The lowpass filter circuit is configured to smooth output electricity between line and neutral conductors $L_{OUT}$ and $N_{OUT}$. The combination of capacitor C4 and resistor R9 also forms a snubber circuit to subdue voltage transients generated when rapidly switching off a large inductive load.

Exemplary switch controlling unit 440 of PCCA 400 comprises a switch driver 445 that may be implemented by an optically isolated MOSFET/IGBT driver U1. In certain embodiments, switch driver 445 is constructed or otherwise configured for rapid switch transitions, e.g., on the order of one (1) μs. A floating DC voltage source 448 comprising transformer X1, rectifier formed by diodes D7-D10, and capacitor C5 provides operating power for switching mechanism 420.

Exemplary switching mechanism 420 comprises a pair of power MOSFETs M1 and M2 connected one to the other at their sources and at their gates. Switch circuit 420 may be compelled into its respective conducting and non-conducting states by applying voltage $V_{DRV}$ across the commonly-connected gates by way of switch driver 445. A resistor R7 may be connected across the commonly-connected gate-source junctions to dampen oscillations owing to lead inductance and gate capacitance of MOSFETs M1 and M2. VA1 and VA2 may be 600-650V MOVs to protect MOSFETs M1 and M2 from voltage transients generated when rapidly switching off a large inductive load. Zener diode ZD2 and diode D6 protect switch driver 445.

Input sensing unit 430i may comprise a rectifier 435 constructed from diodes D1-D4 by which input voltage $V_{IN}$ is represented through positive voltage. The rectified voltage waveform $V_{SENSE}$ appears across (relative to the common voltage of the rectifier) resistor R1, surge sensor 432 and swell sensor 434.

Surge sensor 432 may be implemented by a highpass filter formed of the combination of capacitor C3 and resistor R4 for which the passband is well-removed from the nominal frequency of the input signal $V_{IN}$. Indeed, values of capacitor C3 and resistor R4 may be selected to pass pulses of a predetermined, maximum duration corresponding to temporally narrow voltage surges. The output of the highpass filter, i.e., the node between capacitor C3 and resistor R4 may be connected to the SURGE terminal of PCU 450. Power events having lower frequency voltage characteristics than voltage surges may be detected by swell sensor 434, which may be implemented by a voltage divider formed of resistors R5 and R6. The output of the voltage divider, i.e., the node between resistors R5 and R6, may be connected to the SWELL terminal of PCU 450.

In response to detecting a voltage surge, referred to herein as a "surge event," PCU 450 may compel switching mechanism 420 to rapidly transition between conducting and non-conducting states so as to superimpose a voltage notch on the output electricity at the location of the voltage surge. In response to detecting a voltage swell, referred to herein as a "swell event," PCU 450 may compel switching mechanism 420 to rapidly transition between conducting and non-conducting states so as to superimpose one or more voltage notches on the input electricity at the location of each voltage peak where the input electricity exceeds an established overvoltage threshold, e.g., threshold voltage $V_{SWLL-TH}$.

Output sensing unit 430o may comprise a rectifier 437 constructed from diodes D11-D14 by which output voltage $V_{OUT}$ is represented through positive voltage. The rectified voltage waveform may be applied across a voltage divider constructed from resistor R10 and R11, providing thereby feedback signal $V_{FB}$ to PCU 450.

Those having skill in the control arts will recognize and appreciate that PCU 450 may be implemented in both analog and digital circuitry. For purposes of general description, PCU 450 is illustrated in FIG. 4 as a functional block to which other circuitry of PCCA 400 is connected through terminals V+, V−, SURGE, SWELL, MOD, FDBACK and COM. However, it is to be understood that physical manifestations of the aforementioned terminals are not required to implement PCU circuitry described herein or the circuitry to which PCU circuitry is connected. Terminals V+ and V− may be connected to a power supply 452 from which operating power is provided to PCU 450. SURGE, SWELL and FDBACK terminals may be configured to accept input signals and MOD may be configured as an output terminal that provides modulation signal $V_{MOD}$.

The output of PCU 450, $V_{MOD}$, may be provided to switch driver 445 of switch controlling unit 440. When $V_{MOD}$ is provided to switch driver 445 at a level that exceeds its "on" threshold, switch driver 445 may be compelled into its on state and, in response, switching mechanism 420 is compelled into its conducting state thus providing electrical power to connected load equipment. Upon an occurrence of a power event, PCU 450 may compel modulation signal $V_{MOD}$ below an "off" threshold and, accordingly, switch driver 445 may be compelled into its off state. In response, switching mechanism 420 may be compelled into its non-conducting state thus preventing the overvoltage from passing to load equipment.

PCCA 400 has been described with regard to normal or differential mode transients occurring between line and neutral conductors; however, it is to be understood that common mode transients may be ameliorated using the inventive concepts described herein by suitable electrical coupling to a ground conductor, as those with skill in the electrical design arts will recognize and appreciate.

Figure 5A:
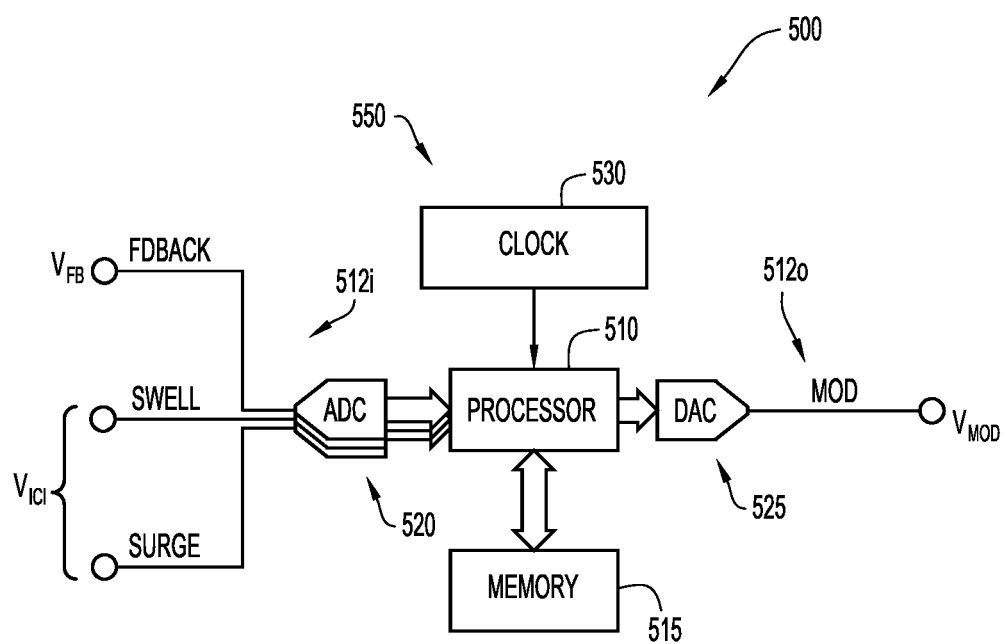
FIGS. 5A-5B are schematic block diagrams of an exemplary power control unit by which the present general inventive concept can be embodied.
Figure 5B:
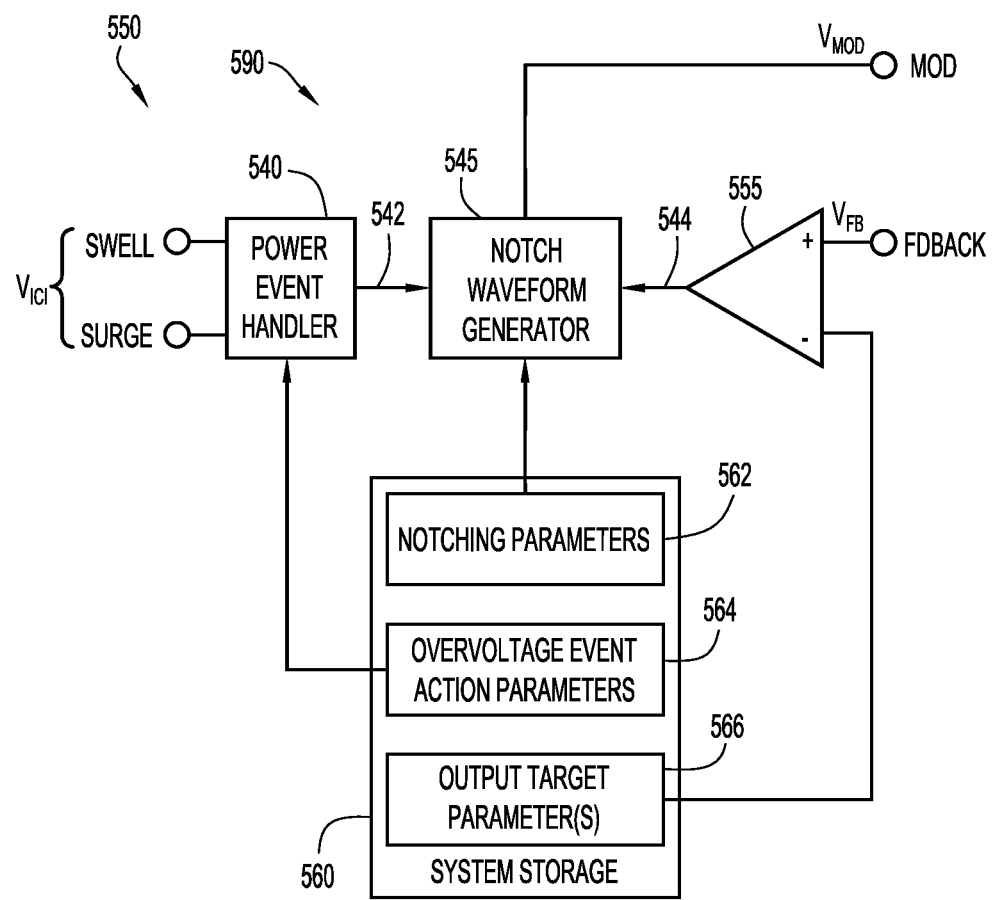

FIGS. 5A-5B are diagrams of an exemplary power control unit 550 that can be incorporated into embodiments of the present invention, e.g., as PCU 450 in PCCA 400 and PCU 250 in PCCA 200. For purposes of description, PCU 550 is illustrated with SURGE, SWELL, MOD and FDBACK terminals that correspond to SURGE, SWELL, MOD and FDBACK terminals of PCU 450 in FIG. 4. The operating power connections on V+ and V− have been omitted for simplicity; those having skill in the digital arts will recognize numerous operating power provision circuits and techniques that can be used in conjunction with the present invention without departing from the spirit and intended scope thereof.

FIG. 5A is a schematic block diagram of processing circuitry 500 on which PCU 550 may be implemented. As illustrated in FIG. 5A, PCU 550 may include a processor 510 communicatively coupled to memory 515. Memory 515 may be constructed or otherwise configured to store both data and code, i.e., programmed processor instructions that, when executed by processor 510, performs power control functions described herein. To that end, PCU 550 may comprise input/output (I/O) circuitry 512, representatively illustrated by input circuit 512i and output circuit 512o, electrically coupled to analog-to-digital converter (ADC) circuitry 520 and digital-to-analog converter (DAC) circuitry 525. In certain embodiments, analog signals $V_{FB}$ and $V_{ICI}$ are converted to numerical values by ADC circuitry 520, which is illustrated in FIG. 5A as comprising an ADC for each input signal. It is to be understood, however, that the present invention is not so limited. Those having skill in digitization will recognize numerous circuit configurations by which multiple analog input signals are provided to a common digital processor, e.g., a multiplexer, that can be used in conjunction with the present invention without departing from the spirit and intended scope thereof Additionally, modulation signal $V_{MOD}$ is illustrated as being generated by DAC circuitry 525 from a digital number produced by processor 510. However, in certain embodiments, $V_{MOD}$ is produced as properly buffered binary output from processor 510, thus obviating the need for DAC circuitry 525.

PCU 550 may include a clock circuit 530 to provide a timing basis for various power control operations, e.g., sampling, event timing, modulation timing, etc. The present invention is not limited to a particular clock/timer implementation; numerous such implementations can be used with the present invention without departing from the spirit and intended scope thereof.

FIG. 5B is a schematic block diagram of an exemplary power controller 590 in which the present invention can be embodied. Power controller 590 may be implemented in the circuitry of FIG. 5A, as those skilled in power control will recognize and appreciate. For purposes of explanation and not limitation, power controller 590 comprises: a power event handler 540 by which an action-indicating signal 542 is generated in accordance with the state of input condition-indicating signal $V_{ICI}$; a notch waveform generator 545 by which modulation signal $V_{MOD}$ is generated in accordance with a selected modulation scheme; and a comparator 555 by which feedback signal $V_{FB}$ is evaluated against one or more criteria, e.g., an output voltage acceptability criterion discussed above. System storage 560 may be implemented in memory 515 to store: notching parameters 562 from which modulation schemes are realized; overvoltage event action parameters 564 defining actions, e.g., modulation schemes, associated with overvoltage events, e.g., surge and swell events; and one or more output target parameters 566 defining target level(s) of output voltage $V_{OUT}$ during modulation, e.g., $V_{ACC-TH}$.

Power event handler 540 may receive input condition-indicating signal $V_{ICI}$ and assert a modulation scheme appropriate for an event per overvoltage event action parameters 564. For example, upon a voltage surge event, power event handler 540 may compel notch waveform generator 545 to generate modulation signal $V_{MOD}$ without feedback information conveyed on $V_{FB}$, whereas upon a swell event, power event handler 540 may compel notch waveform generator 545 to generate modulation signal $V_{MOD}$ in accordance with feedback information conveyed on $V_{FB}$. In response to a surge event, notch waveform generator 545 may form a voltage notch solely from timing information contained in notching parameters 562, as described with reference to FIG. 3A. On the other hand, in response to a swell event, notch waveform generator 545 may form a single notch over the duration for which $V_{ICI}$ indicates that a surge peak is present, as described with reference to FIG. 3B, or may form multiple notches so that output voltage $V_{OUT}$ (as represented on $V_{FB}$) meets an acceptability criterion stored in output target parameter storage 566. The latter case may be implemented as PWM, as described with reference to FIG. 3D.

Figure 6:
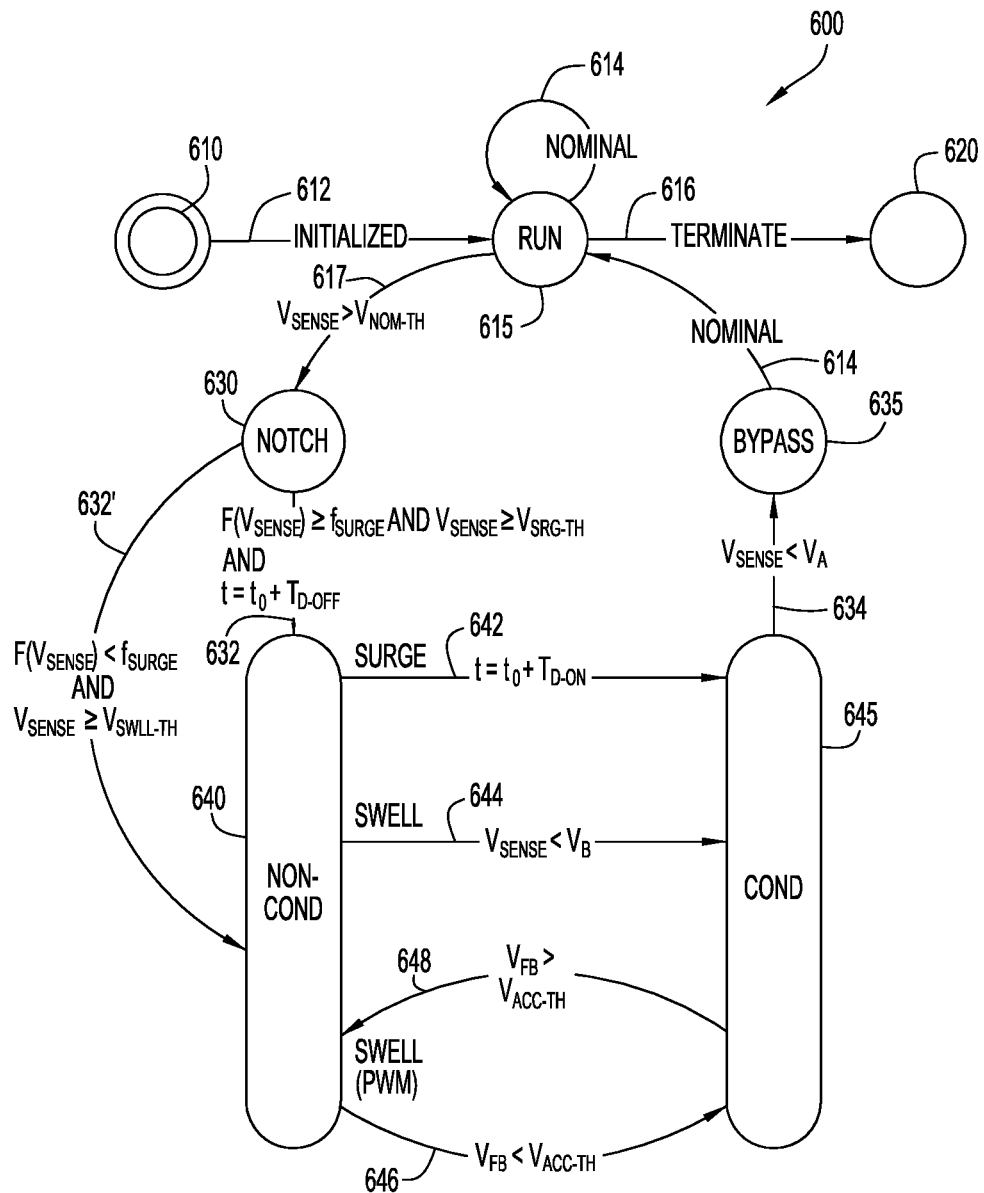
FIG. 6 is a state diagram of an exemplary state machine by which the present general inventive concept can be embodied.

FIG. 6 is a state diagram illustrative of a state machine 600 through which operation of PCCA 200 is further explained. Per well-known conventions, the state diagram for state machine 600 is a directed graph in which the circular/oval nodes represent states and the directed-arc edges represent events in response to which the state transitions occur. State machine 600 operates under conditions placed on one or more process variables that may include measurement process variables, such as $V_{SENSE}$, the input voltage measurement, $V_{FB}$, the output voltage measurement, $F(V_{SENSE})$, the frequency content of the input voltage, and t, the current or elapsed time. State machine 600 may be realized by processing and memory resources on PCU 250. For purposes of succinct description, a minimal number of process variables, states and events are depicted and described with reference to FIG. 6; upon review of this disclosure, those having skill in the art will recognize and appreciate how a larger number of states, process variables, events, signals, etc., can be incorporated into embodiments of the invention without departing from the spirit and intended scope thereof.

Exemplary state machine 600 is instantiated in an initial state 610 in which PCCA 200 is initialized. Initialization may include placing switching mechanism 220 into predetermined state, e.g., bypass switch component 224 in its closed state and semiconductor switch component 222 in its non-conducting state. An initialized event 612 may occur upon completion of such initialization, in response to which exemplary state machine 600 is compelled into run state 615. Run state 615 represents the state in which PCCA 200 executes its primary processing execution loop that includes, among other things, monitoring of various process variables and compelling state transitions in response to process events. Such execution loop may be exited through a terminate event 616, such as by user issuance of a "quit" command or the like, in response to which state machine 600 transitions into terminal state 620.

PCU 250 may continually monitor characteristics of the input voltage (and/or other processes and signals) through process variables $V_{SENSE}$ and $F(V_{SENSE})$ and nominal events 614 may occur responsive to voltage and frequency of the supplied input power being within a predefined nominal range. Consequently, state machine 600 remains in run state 615 in response to each nominal event 614.

Exemplary state machine 600 accommodates three (3) modulation schemes: a surge modulation scheme in which temporal width and location of the notch is timed from the receipt of a trigger signal, as described with reference to FIG. 3A; a swell modulation scheme in which the temporal width and location of the notch is established by threshold crossings, as described with reference to FIG. 3B; and a swell PWM scheme in which the temporal width and location of one or more notches depends on the level of the output voltage, as described with reference to FIG. 3D. Those having skill in the art will recognize other modulation schemes that can be incorporated into embodiments of the present invention without deviating from the spirit and intended scope thereof.

State machine 600 may transition into a notch state 630 in response to overvoltage event 617, which occurs when $V_{SENSE} > V_{NOM-TH}$. While in notch state 630, power control unit 250 may compel bypass switch component 224 into its open state such that load current is controlled solely through semiconductor switch component 222. From notch state 630, state machine 600 may transition into a non-conducting state 640 in response to surge overvoltage mitigation event 632, occurring when $F(V_{SENSE}) \geq f_{SURGE}$ AND $V_{SENSE} \geq V_{SRG-TH}$ AND $t=t_0+T_{D-OFF}$. In non-conducting state 640, semiconductor switch component 222 may be operated into its non-conducting state in which electrical power is removed from load equipment 20. Then, in accordance with the surge modulation scheme, state machine 600 may transition into a conducting state 645 in response to timer event 642, i.e., $t=t_0+T_{D-ON}$, i.e., subsequent to a delay time $T_{D-ON}$ measured from the time the voltage surge was detected.

In response to a swell overvoltage mitigation event 632', occurring when $F(V_{SENSE}) < f_{SURGE}$ AND $V_{SENSE} \geq V_{SWLL-TH}$, state machine 600 may transition into non-conducting state 640. For the swell modulation scheme, state machine 600 transitions to conducting state 645 in response to restoration event 644, which occurs when $V_{SENSE} < V_B$. For the swell PWM scheme, state machine 600 transitions to conducting state 645 in response to restoration events 646, which occurs when $V_{FB} < V_{ACC-TH}$, i.e., when output voltage $V_{OUT}$ as represented through feedback signal $V_{FB}$, meets an output voltage acceptability criterion, e.g., $V_{ACC-TH}$. Then, in the swell PWM scheme, state machine 600 returns to non-conducting state 640 in response to unacceptability events 648, which occurs when output voltage $V_{OUT}$ fails to meet the acceptability criterion, e.g., $V_{FB} > V_{ACC-TH}$. State machine 600 continues such transitioning between conducting state 645 and non-conduction state 640 while the swell condition exists and power control unit 250 compels the swell PWM scheme.

When power controller 250 determines the surge and/or swell conditions have cleared, a clearance event 634 may occur, e.g., $V_{SENSE}$ falls below voltage threshold $V_A$. In response to clearance event 634, state machine 600 may transition into a bypass state 635 in which bypass switch component 224 is closed. In certain embodiments, semiconductor switch component 222 is compelled into its non-conducting state once bypass switch component 224 has been closed. When switching mechanism 220 has been so configured for nominal voltage operation and $V_{SENSE} \leq V_{NOM-TH}$, a nominal event 614 may occur in response to which state machine 600 may transition into run state 615.

It is to be understood that the foregoing is merely an example of a state machine implementation of PCU 250 and is provided for purposes of explanation and not limitation. Those having skill in the art may recognize numerous alternatives, including other state machine configurations that can be implemented in embodiments of the invention without departing from the spirit and intended scope thereof. In one such alternative embodiment, in which switching mechanism 220 excludes bypass switch component 224, state machine 600 may not implement bypass state 635 or notch state 630.

Figure 7:
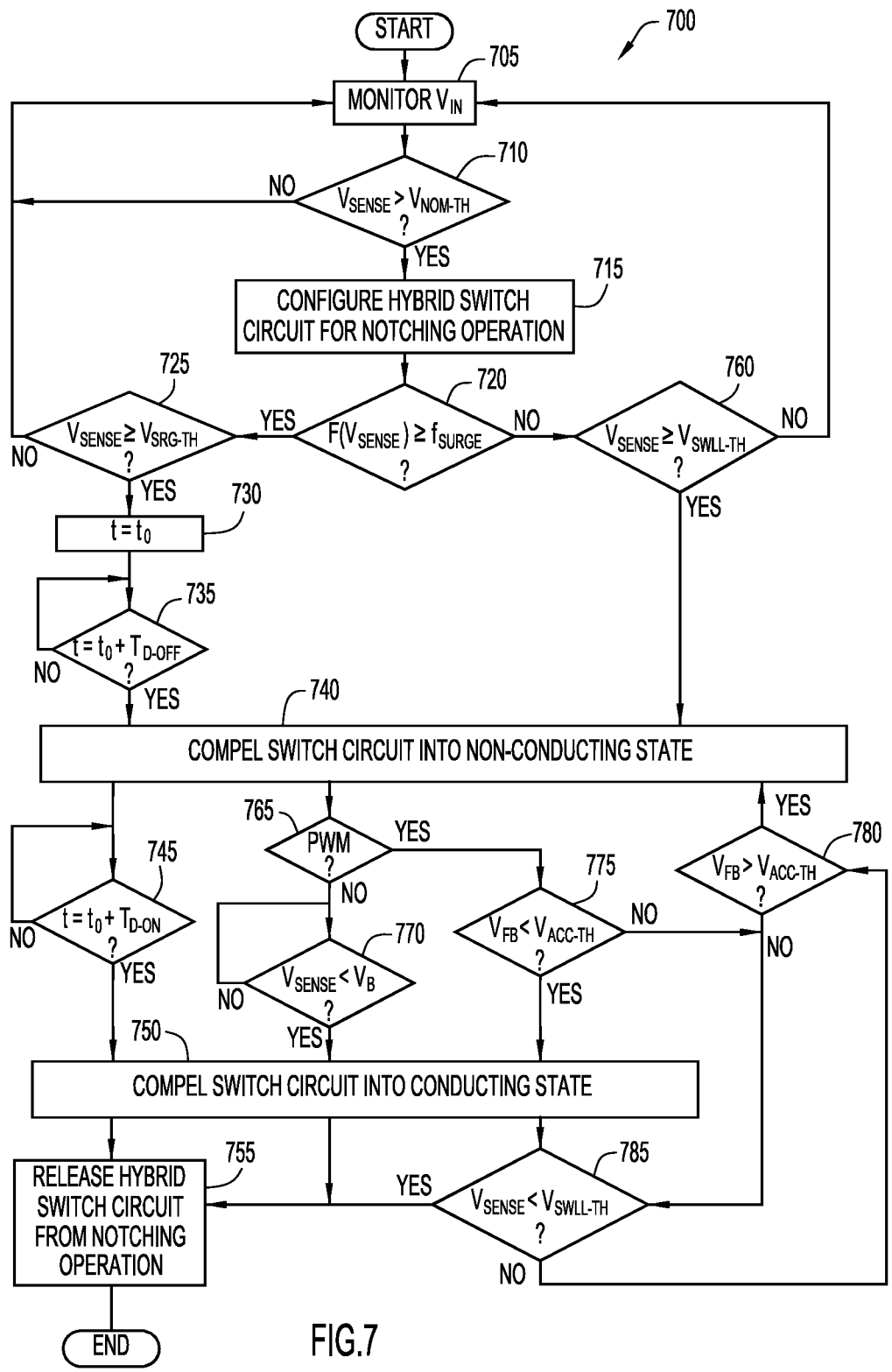
FIG. 7 is a flow diagram of a power control process by which the present general inventive concept can be embodied.

FIG. 7 is a flow diagram of a power control process 700 by which the present invention can be embodied. Power control process 700 can be implemented by electrical and/or electronic circuitry, as described above, or as suitably programmed processor instructions executing on a processor, e.g., a microcontroller and/or microprocessor. In operation 705, input voltage $V_{IN}$ is monitored and, in operation 710, the monitored input voltage is evaluated for an overvoltage condition, e.g., whether $V_{SENSE} > V_{NOM-TH}$. If it is determined that an overvoltage condition exists, process 700 may transition to operation 715 by which the hybrid switch circuit, if such is being utilized, is prepared for notching operations. For example, in one embodiment where the hybrid switch comprises an electromagnetic bypass relay across a semiconductor switch circuit, the semiconductor switch circuitry can be compelled into its conducting state and the electromagnetic relay can be compelled into its open state. However, it is to be understood that operation 715 can be omitted or replaced with a switch configuration operation suitable to the switch architecture used.

In operation 720, it is determined whether the frequency content of the input electricity, $F(V_{SENSE})$, is greater than a predetermined frequency threshold $f_{SURGE}$, such as by the use of an analog or digital highpass filter. If it is affirmed that $F(V_{SENSE}) \geq f_{SURGE}$, it is determined in operation 725 whether $V_{SENSE}$ is greater than a trigger threshold established for surge triggering, $V_{SRG-TH}$. In response to such occurring, process 700 may transition to operation 730 by which a timer may be initialized to $t_0$. In operation 735, it is determined whether the timer has advanced to time $t=t_0+T_{D-OFF}$ and, if so, the switch circuit may be compelled into its non-conducting state in operation 740. In operation 745, it is determined whether the timer has advanced to time $t=t_0+T_{D-ON}$. Once such has occurred, the switch circuit may be compelled into its conducting state in operation 750 and, in operation 755, the hybrid switch circuit may be released from notching operations, e.g., the bypass relay can be closed and semiconductor switch circuit can be compelled into its non-conducting state.

If, in operation 720, it is determined that $F(V_{SENSE}) < f_{SURGE}$, process 700 may transition to operation 760, by which it is determined whether $V_{SENSE}$ is greater than a threshold, $V_{SWLL-TH}$, established for swell modulation. In response to such occurring, process 700 may transition to operation 740 by which the switch circuit may be compelled into its non-conducting state. In operation 765, it is determined whether a PWM scheme is to be applied and, if not, it is determined in operation 770 whether $V_{SENSE}$ has fallen below restoration threshold $V_B$. In response to VSENSE<VB, process 700 may transition to operation 750, whereby the switch circuit is compelled into its conducting state. Process 700 may then proceed to operation 755, whereby the hybrid switch is released from notching operation.

If, in operation 765, it is determined that PWM is to be applied for swell overvoltage mitigation, process 700 may transition to operation 775, whereby it is determined whether $V_{FB}$ has fallen below acceptability threshold $V_{ACC-TH}$. If so, the switch circuit may be compelled into its conducting state in operation 750. Process 700 may then transition to operation 785, whereby it is determined whether VSENSE has fallen below swell threshold $V_{SWLL-TH}$ and, if so, process 700 may transition to operation 755 by which the hybrid switch circuit may be released from notching operations.

If, in operation 785, it is determined that $V_{SENSE}$> $V_{SWLL-TH}$, process 700 may transition to operation 780, by which it is determined whether $V_{FB}$>$V_{ACC-TH}$ and, if so, the switch circuit may be compelled into its non-conducting state in operation 740. Process 700 may transition to operation 765 and continue from that point.

Having described preferred embodiments of new and improved power-centric conditioning and control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

The invention claimed is:

1. An apparatus to protect an electrical load connected to an output port thereof from anomalous electricity, the apparatus providing output electricity at the output port from input electricity accepted through an input port thereof, the apparatus comprising:
   an input sensing unit electrically connected to the input port and configured to indicate an overvoltage event;
   a power control unit configured to generate, responsive to the overvoltage event, a modulation signal that defines at least one amplitude notch of variable temporal width, and further configured to establish the notch width in accordance with an event type of the overvoltage event, the event type being distinguished from at least one other event type by waveform characteristics of the input electricity; and
   a switching mechanism electrically interposed between the input port and the output port and being configured to transition into conducting and non-conducting states in accordance with the modulation signal to superimpose thereby the amplitude notch on electricity conveyed to the output port through the switching mechanism.

2. The apparatus of claim 1, wherein the power control unit is further configured to establish a plurality of the amplitude notches, the temporal width of each of the amplitude notches being established by the power control unit in correspondence to at least one characteristic of the output electricity.

3. The apparatus of claim 2, wherein the power control unit is prohibited from establishing more than one of the amplitude notches for at least one event type and compels establishing more than one of the amplitude notches for at least one other event type.

4. The apparatus of claim 3, wherein the event type for which the power control unit is prohibited from establishing more than one of the amplitude notches is a voltage surge event type and the event type for which the power control unit compels establishing more than one of the amplitude notches is a voltage swell event type.

5. The apparatus of claim 4, wherein the power control unit is configured to distinguish the voltage surge event type from the voltage swell event type by frequency characteristics of the input electricity.

6. The apparatus of claim 3, wherein the power control unit is further configured to:
   compare the characteristic of the output electricity with at least one acceptability criterion;
   modify the modulation signal responsive to failure of the output electricity to meet the acceptability criterion.

7. The apparatus of claim 6, wherein the power control unit comprises a pulse width modulator to generate the modulation signal, the pulse width modulator being configured to modify the notch width of each of the amplitude notches in response to the output electricity failing to meet the acceptability criterion.

8. The apparatus of claim 7, further comprising:
   an output sensing unit to provide an indication of voltage level of the output electricity at the output port, wherein the power control unit is configured to generate the modulation signal by the pulse width modulator to compel the output voltage level towards meeting the acceptability criterion.

9. The apparatus of claim 8, further comprising:
   an output filter electrically interposed between the switching mechanism and the output sensing unit, the output filter configured to filter the electricity conveyed to the output port through the switching mechanism to produce thereby the output electricity.

10. A method of protecting an electrical load from anomalous electricity, the method comprising:
    generating, responsive to an overvoltage event, a modulation signal that defines at least one amplitude notch of variable temporal width;
    distinguishing an event type of the overvoltage event from at least one other event type by waveform characteristics of the input electricity;
    establishing the notch width in accordance with the event type of the overvoltage event and
    compelling a switching mechanism to transition into conducting and non-conducting states in accordance with the modulation signal to superimpose thereby the amplitude notch on electricity conveyed to an output port through the switching mechanism, wherein output electricity is provided at the output port from input electricity accepted through an input port.

11. The method of claim 10, further comprising:
    distinguishing the voltage surge event type from the voltage swell event type by frequency characteristics of the input electricity.

12. The method of claim 10, further comprising:
    establishing a plurality of the amplitude notches, the temporal width of each of the amplitude notches being established in correspondence to at least one characteristic of the output electricity.

13. The method of claim 12, further comprising:
    comparing the characteristic of the output electricity with at least one acceptability criterion; and modifying the modulation signal responsive to failure of the output electricity to meet the acceptability criterion.

14. A tangible, non-transient computer-readable medium having processor instructions encoded thereon that, when executed by a processor, causes the processor to:
   generate, responsive to an overvoltage event, a modulation signal that defines at least one amplitude notch of variable temporal width;
   distinguish an event type of the overvoltage event from at least one other event type by waveform characteristics of the input electricity;
   establish the notch width in accordance with the event type of the overvoltage event; and
   compel a switching mechanism to transition into conducting and non-conducting states in accordance with the modulation signal to superimpose thereby the amplitude notch on electricity conveyed to an output port through the switching mechanism, wherein output electricity is provided at the output port from input electricity accepted through an input port.

15. The computer-readable medium of claim 14 having further processor instructions encoded thereon that cause the processor to:
   distinguish the voltage surge event type from the voltage swell event type by frequency characteristics of the input electricity.

16. The computer-readable medium of claim 14 having further processor instructions encoded thereon that cause the processor to:
   establish a plurality of the amplitude notches, the temporal width of each of the amplitude notches being established in correspondence to at least one characteristic of the output electricity.

17. The computer-readable medium of claim 16 having further processor instructions encoded thereon that cause the processor to:
   compare the characteristic of the output electricity with at least one acceptability criterion;
   modify the modulation signal responsive to failure of the output electricity to meet the acceptability criterion.

* * * * *